Patented Mar. 2, 1943

2,312,694

UNITED STATES PATENT OFFICE 2,312,694

TRIAZINE DERIVATIVES

Gaetano F. D'Alelio, Pittsfield, Mass., assignor to General Electric Company, a corporation of New York No Drawing. Application November 7, 1941, Serial No. 418,220

14 Claims. (Cl. 260—248)

This invention relates to new chemical compounds and more particularly to triazine derivatives. The invention especially is concerned with the production of new and useful bis-(diamino triazinyl thio alkylamido) and bis-(diamino triazinyl thio alkylthionoamido) derivatives of divalent hydrocarbons.

The triazine derivatives of this invention may be represented graphically by the following general formula:

I
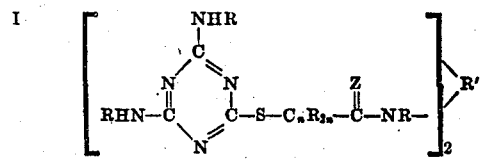

In the above formula $n$ represents an integer and is at least 1 and not more than 2, Z represents a member of the class consisting of oxygen and sulfur, R represents a member of the class consisting of hydrogen and monovalent hydrocarbon and substituted hydrocarbon radicals, more particularly halo-hydrocarbon radicals, and R' represents a member of the class consisting of divalent hydrocarbon and substituted hydrocarbon radicals, more particularly halo-hydrocarbon radicals. Since $n$ represents an integer which is 1 or 2, it will be seen that the linkage of the sulfur atom to the carbamyl-alkyl or thionocarbamyl-alkyl grouping in all cases will be alpha or beta to the carbamyl or thionocarbamyl grouping. It also will be observed that the amino (—NHR) groups and the sulfur atom are attached directly to a carbon atom of the triazine nucleus.

Illustrative examples of radicals that R in the above formula may represent are: aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiarybutylphenyl, etc.); aryl-substituted aliphatic (e. g., benzyl, phenylethyl, phenylpropyl, cinnamyl, etc.); and their homologues, as well as those groups with one or more of their hydrogen atoms substituted by, for example, a halogen. Preferably R in Formula I is hydrogen. However, there also may be produced in accordance with the present invention chemical compounds such, for instance, as those represented by the general formulas:

II
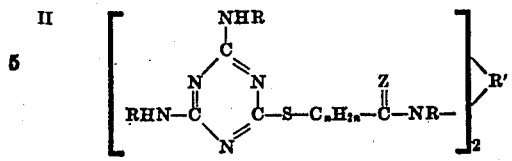

and, more particularly,

III
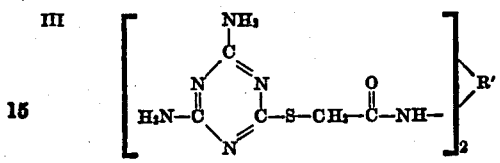

where $n$, Z, R and R' have the same meanings as above given with particular reference to Formula I.

Illustrative examples of divalent radicals that R' in the above formulas may represent are: divalent aliphatic, e. g., ethylene, propylene (trimethylene), propenylene, butylene, isobutylene, pentylene, isopentylene, etc., including divalent cycloaliphatic, e. g., cyclopentylene, cyclopentenylene, cyclohexylene, cyclohexenylene, cylcloheptylene, etc.; divalent aromatic, e. g., phenylene, xenylene, naphthylene, etc.; divalent aliphatic-substituted aromatic, e. g., 2,4-tolylene, ethyl 2,5-phenylene, isopropyl 3,4-phenylene, 1-butyl 2,4-naphthylene, etc.; divalent aromatic-substituted aliphatic, e. g., phenylethylene, phenylpropylene, naphthylisobutylene, xylylene, alpha-(4-tolylene) beta'-butyl, etc.; radicals that may be classed either as divalent aliphatic-substituted aromatic or divalent aromatic-substituted aliphatic, e. g., 4, alpha-tolylene, 3, beta-phenyleneethyl, 4, alpha-xylylene, 2, gamma-phenylenebutyl, etc.; and their homologues, as well as those divalent radicals with one or more of their hydrogen atoms replaced by a substituent, e. g., halogeno, amino, acetyl, acetoxy, carboalkoxy alkoxy, aryloxy, hydroxy, alkyl, alkenyl, etc. Specific examples of substituted divalent radicals are chloroethylene, chloropropylene, bromobutylene, chlorophenylene, chlorotolylene, bromophenylene, chloronaphthalene, bromonaphthalene, bromo 1,4-tolylene, chlorocyclopentylene, chlorocyclopentenylene, carbomethoxyphenylene, ethoxyphenylene, acetophenylene, acetoxyphenylene, bromocyclopentylene, aminophenylene, phenoxyphenylene, methylphenylene (tolylene), allylphenylene, etc. Preferably R' is ethylene, phenylene or tolylene.

The new compounds of this invention may be used as chemotherapeutic agents and as intermediates in the preparation of other compounds. For example, they may be employed in the preparation of ureido, methylol, hydrazino, carbamyl, amidine, etc., derivatives of the triazine compound embraced by Formula I. These new organic compounds are especially valuable in the preparation of synthetic resinous compositions. Thus, they may be condensed with, for instance, aldehydes, including polymeric aldehydes and aldehyde-addition products, to yield condensation products of particular utility in the plastics and coating arts. Such condensation products are more fully described and are specifically claimed in my copending application Serial No. 419,724, filed November 19, 1941, and assigned to the same assignee as the present invention. These new chemical compounds also may be incorporated into rubber, both natural and synthetic, to modify the properties of the rubber.

More specific examples of the chemical compounds of this invention are the bis-(diamino s-triazinyl thio acetamido)-substituted aliphatic hydrocarbons, more particularly the bis-(diamino s-triazinyl thio acetamido) alkanes, e. g., alpha, beta-bis-(diamino s-triazinyl thio acetamido) ethane, the bis-(diamino s-triazinyl thio acetamido) propanes, etc., and the bis-(diamino s-triazinyl thio acetamido)-substituted aromatic hydrocarbons, e. g., the bis-(diamino s-triazinyl thio acetamido) benzenes, the bis-(diamino s-triazinyl thio acetamido) toluenes, etc.

Various methods may be employed to produce the chemical compounds with which this invention is concerned. I prefer to prepare them by effecting reaction between a bis-(halogeno alkylamido)-substituted divalent hydrocarbon or a bis-(halogeno alkylthionoamido)-substituted divalent hydrocarbon and a mercapto diamino s-triazine in the presence of a hydrohalide acceptor, the reactants being employed in the ratio of at least two mols of the mercapto diamino s-triazine for each mol of the said substituted divalent hydrocarbon.

Illustrative examples of bis-(halogeno alkylamido) and bis-(halogeno alkylthionoamido)-substituted divalent hydrocarbons that may be used, depending on the end-product desired, are:

Bis-(chloroacetamido) ethane, more particularly alpha, beta-bis-(chloroacetamido) ethane
Bis-(chloroacetothionoamido) ethane, more particularly alpha, beta-bis-(chloroacetothionoamido) ethane
Bis-(chloroacetamido) propanes
Bis-(chloroacetothionoamido) propanes
Bis-(chloroacetamido) butanes
Bis-(chloroacetamido) pentanes
Bis-(chloroacetamido) benzenes
Bis-(chloroacetamido) toluenes
Bis-(chloroacetamido) xylenes
Bis-(chloroacetamido) naphthalenes
Bis-(chloroacetamido) octanes
Bis-(beta-chloropropanamido) propanes
Bis-(N-methyl alpha-bromopropanamido) propenes
Bis-(beta-iodopropanamido) butanes
Bis-(alpha-methyl beta-chloro N-isopropyl propanamido) chloroisobutanes
Bis-(alpha-butyl beta-bromo N-ethyl propanamido) pentanes
Bis-(alpha-phenyl beta-chloro octanamido) isopentanes
Bis-(beta-chlorophenyl beta-bromo N-cyclopentyl butanthionoamido) cyclopentanes
Bis-(alpha, alpha-ditolyl beta-chloro propanamido) cyclohexanes
Bis-(alpha-chlorotolyl alpha-methyl beta-chloro pentanamido) chlorocyclohexenes
Bis-(N-tolyl chloroacetothionoamido) cycloheptanes
Bis-(beta-bromopropanamido) benzenes
Bis-(beta-chloro N-benzyl 4-pentenamido) biphenyls
Bis-(bromocyclopentyl chloro N-naphthyl acetamido) naphthalenes
Bis-(alpha, alpha-ditolyl beta-chloro propanamido) cyclopentanes
Bis-(bromoacetamido) ethane, more particularly alpha, beta-bis-(bromoacetamido) ethane
2,4-bis-(cyclohexenyl bromo acetothionoamido) chlorotoluene
2,5-bis-(beta-phenyl alpha-chloro N-chlorophenyl propanamido) ethylbenzene
3,4-bis-(beta-bromopropanamido) propylbenzene
4,4'-bis-(N-bromoethyl chloroacetamido) diphenylmethane
Alpha, gamma-bis-(N-xenyl chloroacetamido) phenylpropane
Alpha, alpha'-bis-(beta-chloroheptanthionoamido) xylene
2,4-(cyclopentenyl chloro N-aminophenyl acetamido) 1-isobutyl naphthalene
Alpha, beta-bis-(omega-chloro alpha-bromo N-butylphenyl pentanamido) phenylethane
Bis-(bromoacetamido) propanes
Bis-(bromoacetamido) benzenes Illustrative examples of diamino mercapto s-triazines that may be employed, depending upon the particular end-product sought, are:

2-mercapto 4,6-diamino s-triazine (4-mercapto 2,6-diamino s-triazine; 6-mercapto 2,4-diamino s-triazine)
2-mercapto 4,6-di-(methylamino) s-triazine
2-mercapto 4,6-di-(anilino) s-triazine
2-mercapto 4-amino 6-ethylamino s-triazine
2-mercapto 4,6-di-(propylamino) s-triazine
2-mercapto 4-allylamino 6-butylamino s-triazine
2-mercapto 4-isobutylamino 6-cyclopentylamino s-triazine
2-mercapto 4-(3'-butenylamino) 6-isopropylamino s-triazine
2-mercapto 4-pentylamino 6-cyclohexylamino s-triazine
2-mercapto 4-n-hexylamino 6-xenylamino s-triazine
2-mercapto 4-cyclohexenylamino 6-naphthylamino s-triazine
2-mercapto 4-bromotoluido 6-benzylamino s-triazine
2-mercapto 4-phenylchloroethylamino 6-phenethylamino s-triazine
2-mercapto 4-chloroanilino 6-ethylphenylamino s-triazine
2-mercapto 4-cycloheptylamino 6-isopropylphenylamino s-triazine
2-mercapto 4-chlorocyclopentylamino 6-toluido s-triazine
2-mercapto-4-isopropylanilino 6-phenylpropylamino s-triazine
2-mercapto 4-dichloroanilino 6-chloroethylamino s-triazine
2-mercapto 4-amino 6-bromoethylamino s-triazine
2-mercapto 4-amino 6-methylamino s-triazine
2-mercapto 4-amino 6-ethylamino s-triazine 2-mercapto 4-aminoanilino 6-ethylphenylamino s-triazine
2-mercapto 4-amino 6-benzylamino s-triazine
2-mercapto 4-amino 6-xenylamino s-triazine
2-mercapto 4-amino 6-propylamino s-triazine
2-mercapto 4-amino 6-chloroethylamino s-triazine
2-mercapto 4-amino 6-naphthylamino s-triazine Various hydrohalide acceptors may be employed. I prefer to use a hydrohalide acceptor that will react with the mercapto triazine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali-metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino s-triazine and the bis-(halogeno alkylamido) or bis-(halogeno alkylthionoamido) substituted divalent hydrocarbon may be carried out in any suitable manner, but preferably is effected in the presence of a suitable solvent or mixture of solvents. Although various solvents and solvent mixtures may be employed, I prefer to use water or a mixture of water and alcohol. The reaction may be carried out under a variety of temperature and pressure conditions, for instance at normal or at elevated temperatures and at atmospheric, sub-atmospheric or super-atmospheric pressures.

The above reaction may be represented by the following general equation:

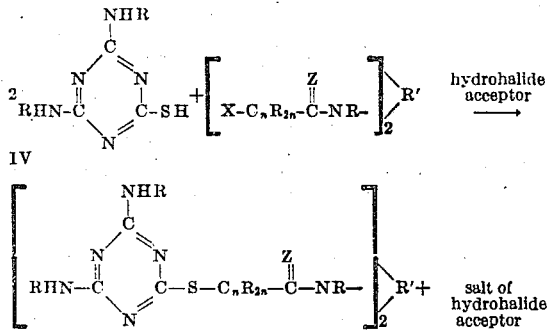

In the above equation X represents halogen (e. g., chlorine, bromine, iodine) and $n$, $Z$, $R$ and $R'$ have the same meanings as given above with reference to Formula I.

The new chemical compounds of this invention also may be prepared by effecting reaction between a halogenated diamino s-triazine and a bis-(mercapto alkylamido) or bis-(mercapto alkylthionoamido) substituted divalent hydrocarbon in the presence of a hydrohalide acceptor. This reaction may be carried out by any suitable means but preferably is effected in the presence of an anhydrous solvent, e. g., alcohol. The other conditions of reaction may be the same as described above with reference to the first-mentioned method of preparation.

Illustrative examples of bis-(mercapto alkylamido) and bis-(mercapto alkylthionoamido) substituted divalent hydrocarbons that may be used, depending on the end-product desired, are:

Bis-(mercaptoacetamido) ethane, more particularly alpha, beta - bis - (mercaptoacetamido) ethane
Bis-(mercaptoacetothionoamido) ethane, more particularly alpha, beta-bis-(mercaptoacetothionoamido) ethane
Bis-(mercaptoacetamido) propanes
Bis-(mercaptoacetothionoamido) propanes
Bis-(mercaptoacetamido) butanes
Bis-(mercaptoacetamido) pentanes
Bis-(mercaptoacetamido) benzenes
Bis-(mercaptoacetamido) toluenes
Bis-(mercaptoacetamido) xylenes
Bis-(mercaptoacetamido) naphthalenes
Bis-(mercaptoacetamido) octanes
Bis-(beta-mercaptopropanamido) propanes
Bis- (N - methyl alpha - mercaptopropanamido) propenes
Bis-(beta-mercaptopropanamido) butanes
Bis-(alpha-phenyl beta - mercapto N - isopropyl propanamido) chloroisobutanes
Bis-(alpha-butyl beta-mercapto N - ethyl propanamido) pentanes
Bis-(alpha-phenyl beta - mercapto octanamido) isopentanes
Bis-(alpha-xylyl alpha-mercapto N-phenyl butanamido) cyclohexanes
Bis-(beta-chlorophenyl beta-mercapto N-cyclopentyl butanthionoamido) cyclopentanes
Bis-(alpha, alpha-ditolyl beta-mercapto propanamido) cyclopentenes
Bis-(alpha-chlorotolyl alpha-methyl beta-mercapto isopentanamido) chlorocyclohexenes
Bis-(N-tolyl mercaptoacetothionoamido) cycloheptanes
Bis-(beta-mercaptopropanamido) benzenes
Bis-(beta-mercapto N - benzyl 4 - pentenamido) biphenyls
Bis - (bromocyclopentyl mercapto N - naphthyl acetamido) naphthalenes
2,4 - bis - (cyclohexenyl mercaptoacetothionoamido) chlorotoluene
2,5-bis-(alpha-mercapto beta-phenyl N-chlorophenyl propanamido) ethylbenzene
3,4-bis-(beta-mercaptopropanamido) propylbenzene
4,4'-bis-(N-bromoethyl mercaptoacetamido) diphenylmethane
2,4-bis-(cyclopentenyl mercapto N-aminophenyl acetamido) 1-isobutyl naphthalene
Alpha, beta-bis-(alpha-mercapto omega - chloro N-butylphenyl pentanamido) phenylethane
Alpha, gamma-bis-(N-xenyl mercaptoacetamido) phenylpropane
Alpha, alpha'-bis-(beta-mercapto heptanthionoamido) xylene Illustrative examples of halogenated diamino s-triazines that may be employed, depending upon the end-product sought, are:
2-chloro 4,6-diamino s-triazine
2-chloro 4,6-di-(methylamino) s-triazine
2-chloro 4,6-di-(anilino) s-triazine
2-bromo 4-amino 6-ethylamino s-triazine
2-chloro 4,6-di-(propylamino) s-triazine
2-bromo 4-allylamino 6-butylamino s-triazine
2-chloro 4-isobutylamino 6-cyclopentylamino s-triazine
2-bromo 4,6-diamino s-triazine
2-iodo 4,6-diamino s-triazine
2-chloro 4-(3'-butenylamino) 6-isopropylamino s-triazine
2-chloro 4-amylamino 6-cyclohexylamino s-triazine
2-chloro 4-$n$-hexylamino 6-xenylamino s-triazine 2-bromo 4-cyclohexenylamino 6-naphthylamino s-triazine
2-chloro 4-chlorocyclopentylamino 6-toluido s-triazine
2-chloro 4-bromotoluido 6-benzylamino s-triazine
2-chloro 4-phenylchloroethylamino 6-phenethylamino s-triazine
2-chloro 4-aminoanilino 6-ethylanilino s-triazine
2-chloro 4-chlorocycloheptylamino 6-isopropylphenylamino s-triazine
2-chloro 4-isopropylanilino 6-phenylpropylamino s-triazine
2-bromo 4-dichloroanilino 6-chloroethylamino s-triazine
2-iodo 4-amino 6-bromoethylamino s-triazine The general reaction for this alternative method of preparing my new chemical compounds is illustrated by the following general equation:

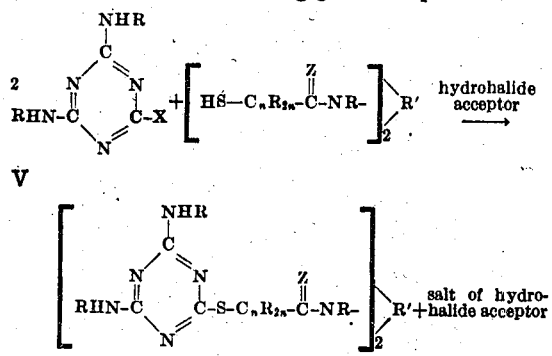

In the above equation X represents halogen (e. g., chlorine, bromine, iodine) and $n$, Z, R and R' have the same meanings as given above with reference to Formula I.

In order that those skilled in the art better may understand how the present invention may be carried into effect, the following illustrative examples are given. All parts are by weight.

*Example 1*

This example illustrates the preparation of alpha, beta-bis-(diamino s-triazinyl thio acetamido) ethane, the formula for which is VI
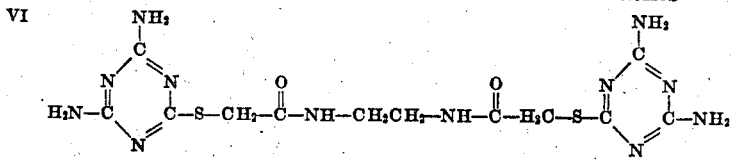

This compound also may be named alpha, beta-bis-(4,6-diamino s-triazinyl-2 thio acetamido) ethane or alpha, beta-bis-(2,4-diaminо s-triazinyl-6 thio acetamido) ethane or alpha, beta-bis-(2,6-diamino s-triazinyl-4 thio acetamido) ethane.

|  | Parts | Approximate mol ratio |
|---|---|---|
| Thioammeline | 191.0 | 2 |
| Alpha, beta-bis-(chloroacetamido)ethane | 142.0 | 1 |
| Sodium hydroxide | 53.4 |  |

The thioammeline was dissolved in a solution of the sodium hydroxide in 1,000 parts water. The bis-(chloro-acetamido) ethane, which had been partly dissolved in 2,000 parts ethyl alcohol, was added to the thioammeline solution, yielding a clear solution that thereupon was heated on a steam plate with constant stirring. A precipitate began to form almost immediately. The reaction was allowed to continue for 40 minutes, after which the reaction mass was permitted to stand for 1 hour at 0° C. The precipitate comprising impure alpha, beta-bis-(diamino s-triazinyl thio acetamido) ethane was filtered off, washed free of soluble salts and dried at 70° C. A yield of 89% of dried product (melting point above 230° C.) was obtained. A Kjeldahl nitrogen analysis of this product showed 37.0% nitrogen, which checks with the theoretical nitrogen content of alpha, beta-bis-(diamino s-triazinyl thio acetamido) ethane within the limits of experimental error.

*Example 2*

Alpha, beta-bis-(diamino s-triazinyl thio acetothionoamido) ethane is produced in essentially the same manner as described under Example 1 with the exception that, instead of alpha, beta-bis-(chloroacetamido) ethane, an equivalent amount of alpha, beta-bis-(chloroacetothionamido) ethane is employed.

*Example 3*

A bis-(diamino s-triazinyl thio acetamido) benzene is produced in essentially the same manner as described under Example 1 with the exception that, instead of alpha, beta-bis-(chloroacetamido) ethane, an equivalent amount of a bis-(chloroacetamido) benzene is used.

*Example 4*

A bis-(diamino s-triazinyl thio acetamido) toluene is produced in essentially the same manner as described under Example 1 with the exception that, instead of alpha, beta-bis-(chloroacetamido) ethane, an equivalent amount of a bis-(chloroacetamido) toluene is employed.

Other examples of the new chemical compounds of this invention are listed below:

Bis-(diamino s-triazinyl thio acetamido) propanes
Bis-(diamino s-triazinyl thio acetothionoamido) propanes
Bis-(diamino s-triazinyl thio acetamido) butanes
Bis-(diamino s-triazinyl thio acetamido) pentanes
Bis-(diamino s-triazinyl thio acetamido) benzenes
Bis-(diamino s-triazinyl thio acetamido) toluenes
Bis-(diamino s-triazinyl thio acetamido) xylenes
Bis-(diamino s-triazinyl thio acetamido) naphthalenes
Bis-(diamino s-triazinyl thio acetamido) chlorobenzenes
Bis-(diamino s-triazinyl thio acetamido) octanes
Bis-(diamino s-triazinyl thio acetamido) chloronaphthalenes
Bis-(diamino s-triazinyl thio acetamido) chlorobutanes
Bis-(diamino s-triazinyl thio acetamido) ethylbenzenes
Alpha, beta-bis-(diamino s-triazinyl alpha-thio propanamido) ethane
Alpha, beta-bis-(diamino s-triazinyl beta-thio propanamido) ethane
Alpha, beta-bis-(diamino s-triazinyl alpha-thio propanthionoamido) ethane
Alpha, beta-bis-(diamino s-triazinyl beta-thio propanthionoamido) ethane Bis-(diamino s-triazinyl alpha-thio propanamido) propanes
Bis-(diamino s-triazinyl beta-thio propanamido) propanes
Bis-(diamino s-triazinyl alpha-thio propanamido) butanes
Bis-(diamino s-triazinyl beta-thio propanamido) butanes
Bis-(diamino s-triazinyl alpha-thio propanamido) pentanes
Bis-(diamino s-triazinyl beta-thio propanamido) pentanes
Bis-(diamino s-triazinyl alpha-thio propanamido) benzenes
Bis-(diamino s-triazinyl beta-thio propanamido) benzenes
Bis-(diamino s-triazinyl alpha-thio propanamido) toluenes
Bis-(diamino s-triazinyl beta-thio propanamido) toluenes
Bis-(diamino s-triazinyl alpha-thio propanamido) xylenes
Bis-(diamino s-triazinyl beta-thio propanamido) xylenes
Bis-(diamino s-triazinyl alpha-thio propanamido) ethylbenzenes
Bis-(diamino s-triazinyl beta-thio propanamido) ethylbenzenes
Bis-(diamino s-triazinyl alpha-thio propanamido) naphthalenes
Bis-(diamino s-triazinyl beta-thio propanamido) naphthalenes
Bis-(diamino s-triazinyl alpha-thio propanamido) chlorobenzenes
Bis-(diamino s-triazinyl beta-thio propanamido) chlorobenzenes
Bis-(diamino s-triazinyl alpha-thio propanamido) chloronaphthalenes
Bis-(diamino s-triazinyl beta-thio propanamido) chloronaphthalenes
Bis-(diamino s-triazinyl alpha-thio propanamido) octanes
Bis-(diamino s-triazinyl beta-thio propanamido) octanes
Bis-(diamino s-triazinyl alpha-thio propanamido) chlorobutanes
Bis-(diamino s-triazinyl beta-thio propanamido) chlorobutanes
Bis-(diamino s-triazinyl alpha-thio propanthionoamido) benzenes
Bis-(diamino s-triazinyl alpha-thio propanthionamido) toluenes
Bis-(diamino s-triazinyl beta-thio propanthionoamido) toluenes
Bis-(diamino s-triazinyl beta-thio propanthionoamido) benzenes
Bis-[4,6-di-(methylamino) s-triazinyl-2 beta-thio propanamido] propanes
Bis-[4,6-di-(anilino) s-triazinyl-2 thio methyl N-methyl acetamido] propenes
Bis-(6-amino 4-ethylamino s-triazinyl-2 beta-thio propanamido) butanes
Bis-[4,6-di-(propylamino) s-triazinyl-2 beta-thio alpha-methyl N-isopropyl propanamido] chloroisobutanes
Bis-(4-allylamino 6-butylamino s-triazinyl-2 beta-thio alpha-butyl N-ethyl propanamido) pentanes
Bis-(4-isobutylamino 6-cyclopentylamino s-triazinyl-2 beta-thio alpha-phenyl beta-pentyl propanamido) isopentenes
Bis-[4-(3'-butenylamino) 6-isopropylamino s-triazinyl-2 beta-thio beta-chlorophenyl beta-methyl N-cyclopentyl propanthionoamido] cyclopentanes
Bis-(4-pentylamino 6-cyclohexylamino s-triazinyl-2 beta-thio alpha-phenyl beta-pentyl propanamido) isopentanes
Bis-(diamino s-triazinyl beta-thio alpha, alpha-ditolyl propanamido) cyclopentenes
Bis-(4-hexylamino 6-xenylamino s-triazinyl-2 thio xylyl ethyl N-phenyl acetamido) cyclohexanes
Bis-(4-cyclohexenylamino 6-naphthylamino s-triazinyl-2 beta-thio alpha, beta, beta-trimethyl alpha-chlorotolyl propanamido) chlorocyclohexenes
Bis-(4-chlorocyclopentylamino 6-toluido s-triazinyl-2 thio N-tolyl acetothionoamido) cycloheptanes
Bis-(4-bromotoluido 6-benzylamino s-triazinyl-2 beta-thio propanamido) benzenes
4,4' - bis-(4''-phenylchloroethylamino 6''-phenethylamino s-triazinyl-2'' beta-thio N-benzyl propanamido) biphenyl
Bis-(4-aminoanilino 6-ethylanilino s-triazinyl-2 thio bromocyclopentyl N-naphthyl acetamido) naphthalenes
2,5-bis-(4'-dichloroanilino 6' - chloroethylamino s-triazinyl-2' thio benzyl N-chlorophenyl acetamido) ethylbenzene
2,4-bis-(4'-cycloheptylamino 6' - phenylpropylamino s-triazinyl-2' thio cyclohexenyl acetothionoamido) chlorotoluene
3,4-bis-(6'-amino 4'-bromoethylamino s-triazinyl-2' beta-thio propanamido) isopropylbenzene
4,4'-bis-(4'',6''-diamino s-triazinyl-2'' thio N-bromoethyl acetamido) diphenylmethane
2,4-bis-[4',6' - di - (pentylamino) s - triazinyl-2' thio cyclopentenyl N-aminophenyl acetamido] 1-isobutyl naphthalene
Bis-(6-amino 4-aminoanilino s-triazinyl-2 thio chloropropyl N-butylphenyl acetamido) phenylethanes
Alpha, alpha'-bis-(diamino s-triazinyl thio acetamido) xylene It will be understood, of course, by those skilled in the art that, in those compounds listed above that are generically named, the diamino s-triazinyl thio alkylamido (or alkylthionoamido) substituents may be attached to any two positions in the hydrocarbon or halo-hydrocarbon nucleus.

In a manner similar to that described above with particular reference to the diamino

[(—NHR)$_2$]

s-triazinyl derivatives, corresponding derivatives of the asymmetrical and vicinal triazines may be prepared. It also will be understood by those skilled in the art from the foregoing description of the preparation of a triazine monosulfide that similar compounds may be prepared in which two or three sulfur atoms are attached directly to a carbon atom of the triazine nucleus.

What I claim as new and desire to secure by Letters Patent of the United States is:

1. Chemical compounds corresponding to the general formula

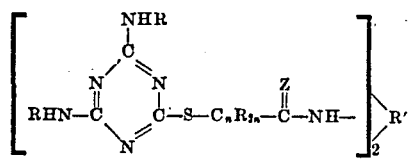

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, and R' represents a member of the class consisting of divalent hydrocarbon and halo-hydrocarbon radicals.

2. Chemical compounds as in claim 1 wherein R represents hydrogen.

3. Chemical compounds as in claim 1 wherein R represents hydrogen, Z represents a member of the class consisting of oxygen and sulfur, and $n$ is 1.

4. Chemical compounds corresponding to the general formula

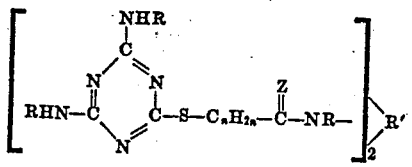

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, and R' represents a member of the class consisting of divalent hydrocarbon and halo-hydrocarbon radicals.

5. Chemical compounds corresponding to the general formula

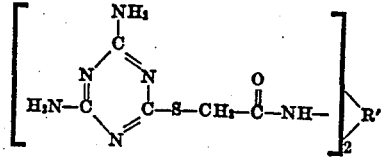

where R' represents a member of the class consisting of divalent hydrocarbon and halo-hydrocarbon radicals.

6. A bis-(diamino s-triazinyl thio acetamido)-substituted aliphatic hydrocarbon.

7. A bis-(diamino s-triazinyl thio acetamido) alkane.

8. Alpha, beta-bis-(diamino s-triazinyl thio acetamido) ethane.

9. A bis-(diamino s-triazinyl thio acetamido)-substituted aromatic hydrocarbon.

10. A bis-(diamino s-triazinyl thio acetamido) benzene.

11. A bis-(diamino s-triazinyl thio acetamido) toluene.

12. The method of preparing chemical compounds corresponding to the general formula

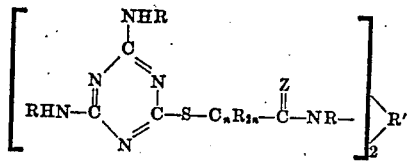

where $n$ represents an integer and is at least 1 and not more than 2, Z represents a member of the class consisting of oxygen and sulfur, R represents a member of the class consisting of hydrogen and monovalent hydrocarbon and halo-hydrocarbon radicals, and R' represents a member of the class consisting of divalent hydrocarbon and halo-hydrocarbon radicals, said method comprising effecting reaction, in the presence of a hydrohalide acceptor, between (1) a mercapto triazine corresponding to the general formula

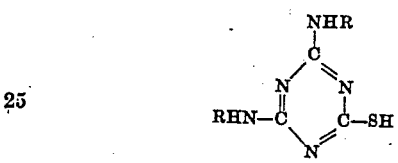

where R has the meaning above given and (2) a compound corresponding to the general formula

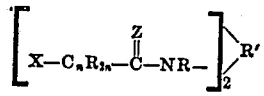

where X represents halogen, and $n$, Z, R and R' have the meanings above given, the components of (1) and (2) being employed in the molar ratios of at least two mols of the mercapto triazine of (1) for each mol of the compound of (2).

13. A method as in claim 12 wherein the hydrohalide acceptor is an alkali-metal hydroxide.

14. A method of preparing alpha, beta-bis-(diamino s-triazinyl thio acetamido) ethane which comprises effecting reaction, in the presence of a hydrohalide acceptor, between thioammeline and alpha, beta-bis-(chloroacetamido) ethane in the ratio of at least two mols of the former per mol of the latter.

GAETANO F. D'ALELIO.

CERTIFICATE OF CORRECTION.

Patent No. 2,312,694.  March 2, 1943.

GAETANO F. D'ALELIO.

It is hereby certified that error appears in the printed specification of the above numbered patent requiring correction as follows: Page 1, second column, line 44, after the word "carboalkoxy" insert a comma; page 5, second column, line 70, in the formula, last portion thereof, for "NH—" read -- NR— --; and that the said Letters Patent should be read with this correction therein that the same may conform to the record of the case in the Patent Office.

Signed and sealed this 13th day of April, A. D. 1943.

(Seal)

Henry Van Arsdale,
Acting Commissioner of Patents.